Fig. 1

INVENTOR.
ALEX J. GALIS
BY
ATTORNEY

INVENTOR
ALEX J. GALIS
BY Stanley J Price
his ATTORNEY

Fig. 4.

INVENTOR
ALEX J. GALIS

United States Patent Office 3,460,331
Patented Aug. 12, 1969

3,460,331
TREE SHAKER APPARATUS
Alex J. Galis, Box 480, Rte. 3, Albany, Ga. 31701
Continuation-in-part of application Ser. No. 523,231,
Jan. 26, 1966. This application June 12, 1967, Ser.
No. 645,321
Int. Cl. A01g 19/06
U.S. Cl. 56—329                                16 Claims

ABSTRACT OF THE DISCLOSURE

Apparatus for imparting motion at the trunk of a fruit bearing tree to dislodge the fruit from the tree limbs. One or more oscillating devices are clamped to the trunk of the tree and together impart a reciprocating or nutating motion to the entire tree at variable preselected amplitudes and in variable preselected directions causing the crop of the tree to be dislodged from the tree during the reciprocating or nutating motion or upon it termination.

RELATED APPLICATION

This application is a continuation-in-part of application Ser. No. 523,231, filed Jan. 26, 1966, now abandoned.

BACKGROUND OF THE INVENTION

Field of the invention

This invention relates to a tree shaker apparatus including means for shaking the trunk of the tree and means for simultaneously catching the tree crop that is dislodged by shaking the tree.

Description of the prior art

Tree crop harvesting machines which have been available heretofore generally have involved one of two types of mechanisms for shaking a tree or a tree limb. One type of shaking mechanism disclossed in U.S. Patent No. 3,121,-304, comprises a rigid member or boom that is reciprocated linearly toward and away from a tree member that is shaken. Another type of shaking mechanism, disclosed in U.S. Patent No. 3,164,943, comprises a cable or similar device which is wrapped around a tree member and which periodically pulls and releases the tree member to dislodge the crop. The rigid boom tree shaking devices are subject to inherent disadvantages in that the shaking apparatus is cumbersome and difficult to manipulate. In addition, such devices impart to both the tree and the harvester machinery stresses of a magnitude that are damaging and generally undesirable. The cable shaking devices are subject to inherent disadvantages in that the cable tends to damage various portions of the tree which it contacts and that the vibrations imparted to the tree are often not of a proper nature or of sufficient magnitude to dislodge the crop from the tree.

Many of the types of tree crop harvesters available heretofore include crop catching devices adapted to encircle the tree while the tree is being shaken to provide a receptacle for the dislodged crop. Some such devices comprise large sheets of rigid material that are positioned around the tree trunk after the harvester is positioned beside the tree. Crop receptacles desirably cover a large area and when constructed of such rigid materials are too large and cumbersome to be readily manipulated around the trees to be harvested and often cause damage to the dislodged crop. Other tree crop harvesters provide umbrella-like receptacles that are unfolded around the tree after the harvester is positioned beside the tree. Such folding crop receptacles heretofore described in the art have been adapted for mechanical operation and actuation by an operator seated on the harvester and, therefore, have necessarily involved the use of structurally complicated mechanisms that are actuated by hydraulic or mechanical means connected to the harvester power apparatus. The use and maintenance of such complicated crop catchers is often undesirable in the close confines and under the rugged conditions often encountered during the harvesting operation.

Novel and unique as applicant's and the other tree crop harvesting devices have proven to be for fruit and nut harvesting it has been found that no tree crop harvester has been able to successfully harvest citrus fruit.

Citrus fruit, such as the orange, grow directly from the branches of the fruit tree. That is to say the stem of the orange is actually the branch of the tree. The apple for instance is suspended from the branch of its tree by a stem and can be dislodged from the tree at a point where the stem joins the apple or at a point where the stem joins the tree. This can be accomplished by a simple oscillation or reciprocation of the fruit tree; however, since the attachment of citrus fruit is particularly inherent to its own type of attachment to its tree it can only be severed from the branch of the tree at the point where the fruit meets the branch. Simple oscillation or reciprocation of the fruit tree or the individual branches per se will not accomplish severance of the citrus fruit from the tree to which it is attached.

It is therefore one object of this invention to provide a tree shaker apparatus that employs two synchronized variable motion transmitting means that can be controlled individually or jointly, that can separately impart simple reciprocation or oscillating motion to the tree to be harvested and together import a nutating motion to the tree trunk, branches and citrus fruit per se thus causing the fruit to be severed from the tree during nutation or upon its termination. The term nutation is intended to designate the path followed by the tree as it moves in a conical generation, when it is rotated due to its being fixed to the ground at one end.

It is a further object of this invention to provide tree shaking apparatus of compact, simple, easily constructed and maintained, that is low cost apparatus and can be easily transported, maintained, connected and disconnected to the trees in the field by relatively unskilled labor.

It is an object of this invention to provide a tree crop harvester having tree shaking apparatus that is of compact and rugged construction mounted on a carriage that is self-propelled or adapted for use with a conventional tractor.

It is a further object of this invention to provide tree shaking apparatus of compact, rugged and relatively simple construction that can be adjusted to impart to a tree a series of vibratory motions in a substantially horizontal plane perpendicular to the longitudinal axis of the tree.

Another object of this invention is the provision of crop catching apparatus of relatively simplified construction comprising a cover of resilient material mounted on extensible rigid supporting members secured to the carriage of the tree crop harvester and adapted to be unfolded around the tree being harvested to form a continuous crop catching device completely surrounding the tree.

SUMMARY OF THE INVENTION

According to the invention there is provided a tree crop harvesting mechanism comprising a mobile carriage having a tree shaking device mounted thereon and a flexible adjustable monolithic tree surrounding crop catching means foldably connected thereto. The tree shaking apparatus includes motion transmitting means mounted on the carriage and adapted to abut the tree. In one embodiment the motion transmitting means comprises two variably adjustable vibrating means adapted to be controlled and operated together each of which is vibrated by an oscillating type motion transmitting means that collectively produce a nutating motion to the trunk of the tree which is transmitted to its branches and the fruit thereon.

The foldable, flexible monolithic crop catching means of this invention comprises a plurality of rigid support members which are adapted to be pivoted about hinges which connect them to said carriage means. A resilient crop catching cover of a canvas or any plastic type material is suspended between the supporting means and adapted to be folded during transportation and relocation from one tree to another.

The entire tree crop harvesting means can be operated, without a mobile carriage, as part of a power take off extension of a conventional tractor.

Another embodiment of the invention is directed to a tree crop harvester comprising a mobile carriage having tree shaking means mounted thereon and extensible crop catching means foldably connected thereto. The tree shaking means comprises oscillating means movably mounted on the carriage means, oscillator driving means connected to the oscillating means and rigidly secured to the carriage means, engaging means connected to the oscillating means and adapted to forcibly engage the trunk of a tree, and vibrating means rigidly connected to the oscillating means and adapted to transmit vibratory forces from the oscillating means to the trunk of a tree.

The crop catching means of this invention comprise a plurality of rigid extensible supporting members pivotally or hingedly connected to the carriage means. A resilient covering material such as canvas or plastic is connected to the supporting members in a manner to permit folding and unfolding of the crop catching means during use of the tree crop harvester. The tree crop harvester can be a self-contained or self-propelled unit or can be adapted for connection to and used with a conventional tractor. In a preferred form of this invention, the carriage means has a U-shaped body having an opening therein adapted to fit around the trunk of a tree being harvested.

DESCRIPTION OF THE PREFERRED EMBODIMENTS

Figure 1:
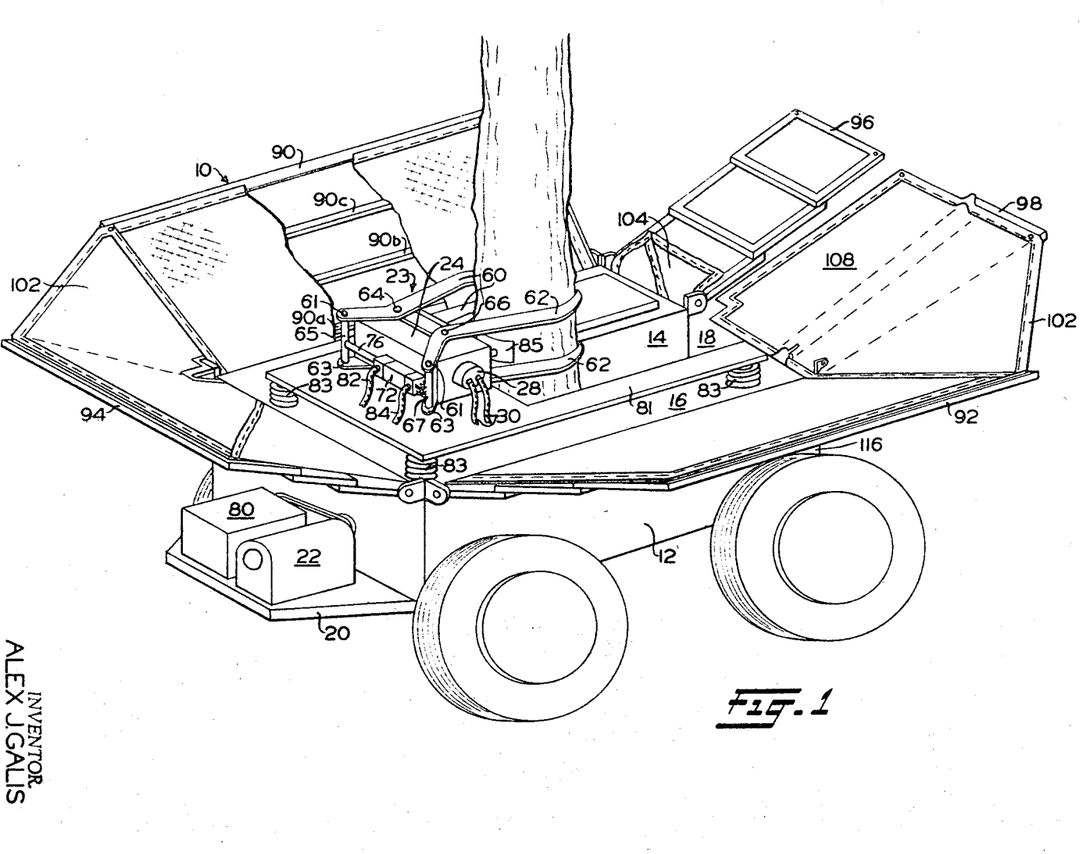
FIGURE 1 is an isometric view of the tree crop harvester of this invention and positioned around the tree to be harvested.

Referring to the drawings in detail, the tree crop harvester is referred to, generally, by reference numeral 10 in FIGURE 1. A mobile carriage 12 comprises parallel body members 14 and 16 defining an opening 18 therebetween, which is adapted to fit around the trunk of a tree.

A plate 20 integral with one end of carriage 12 extends outwardly therefrom and is adapted for the mounting thereon of motor 22 which is used to drive carriage 12 in the embodiment of the invention shown in FIGURE 1. Motor 22 can comprise any type of motor such as a gasoline engine or a diesel engine. In lieu of a self-propelled carriage such as that shown in FIGURE 1, employing motor 22, carriage 12 can be driven by a conventional tractor, in which case plate 20 serves as connecting means for attaching carriage 12 to the tractor. When carriage 12 comprises a self-propelled unit, as shown in FIGURE 1, the tree crop harvester apparatus would also include steering means (not shown in the drawing) which can be mounted on plate 20 and adapted for the steering of carriage 12. The use and construction of such steering means is not a critical element of the apparatus of this invention and any conventional steering apparatus could be used. Therefore, no specific steering means is shown in the drawings.

Motion transmitting means 23 hereinafter referred to as an oscillating means is shown mounted on the upper surface of carriage 12 adjacent the end of opening 18 in the carriage. The means employed for connecting oscillating means 23 to the upper surface of carriage 12 is not critical to the concept of this invention as long as oscillating means 23 is connected to carriage 12 in a manner permitting adjustment of the oscillating means into position whereby the engaging means and the vibrating means can make positive contact with the tree trunk and whereby the oscillating means is able to impart vibratory motion to the tree. Thus, any combination of ball and socket joints, pivotal connections, adjustable mounting brackets, and so forth can be used to connect oscillating means 23 to carriage 12. Alternatively, in particular instances it might be suitable to mount oscillating means 23 rigidly on carriage 12. Oscillating means 23 may be of any known type which produces oscillating forces of controlled magnitude that can be directed substantially perpendicular to the longitudinal axis of the tree. A preferred form of oscillating means comprises a pair of parallel shafts with eccentric weights mounted upon the shafts in opposite phase with the shafts rotatable in opposite directions. The shafts can be arranged and spaced so that the oscillations and thrusts developed can be directed in opposite linear directions or, alternatively, the shafts can be arranged and spaced in such fashion that the cancellation of thrust in different directions by eccentric weights is minimized and the resulting maximum thrusts are directed in a plane substantially normal to the longitudinal axis of the tree.

The construction of oscillating means 23 is shown in detail in FIGURE 1 and FIGURES 3 through 6 and comprises a housing 24 that is movably mounted on the upper surface of carriage 12. A pair of shafts 25 and 26 lie in spaced, parallel relation in housing 24 and are journaled in the housing end walls. Shaft 25 is coupled to the drive shaft 27 of a hydraulic motor 28. Motor 28 is shown diagrammatically in FIGURE 1 as being connected to the housing 24 of oscillating means 23 and having a conductor 30 for drive fluid from motor 28 extending from one end of motor 28 downwardly through the upper surface of carriage means 12. Motor 28 is also a variable speed motor and can be controlled from the machine by suitable, conventional controls (not shown).

Figure 3:
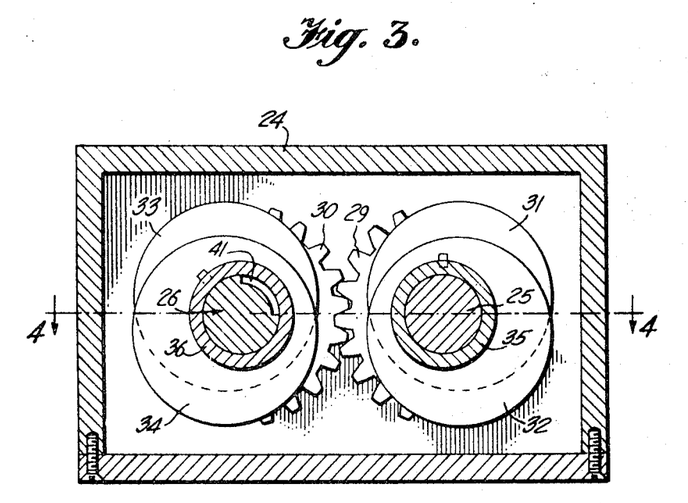
FIGURE 3 is a transverse section through the oscillating means which provides the isolating driving force that is transmitted as vibratory motion to the tree to be harvested.
Figure 4:
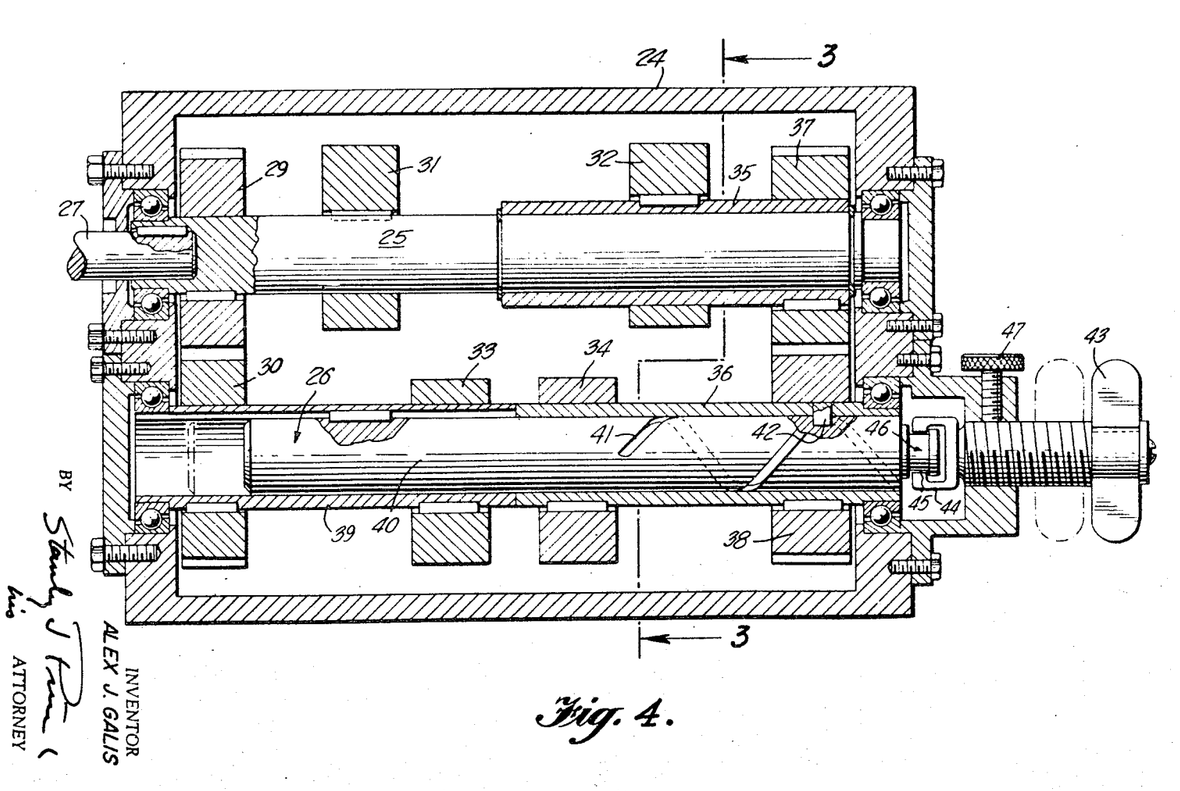
FIGURE 4 is a horizontal section through oscillating means 23, taken on the line 4—4 of FIGURE 3.

Shafts 25 and 26 are interconnected by means of meshing spur gears 29 and 30, gear 29 being mounted upon shaft 25 and gear 30 being mounted upon shaft 26. The gears are identical so that the shafts will have equal and opposite movement. The shafts carry eccentric weights which, in order to permit adjustment, are divided. By this is meant that the total weight to be carried by a shaft is divided in two, and two weights, each one-half the total weight, are used on each shaft. Thus, shaft 25 carries weights 31 and 32, and shaft 26 carries weights 33 and 34. Weights 31 and 33 are fixed relative to their respective shaft, and weights 32 and 34 are fixed to sleeves 35 and 36 which are rotatably mounted upon shafts 25 and 26 respectively, so that the effective force of the combined eccentric weights on each shaft can be varied.

Sleeves 35 and 36 carrying meshing spur gears 37 and 38 to intercouple the adjustable weights for similar operative movement and similar adjustment. In order to adjust the weights, shaft 26 is formed in two parts, and an outer hollow shaft 39 which carries the gear 30 and an inner shaft 40 keyed to and telescopically slidable in hollow shaft 39. Inner shaft 40 carries sleeve 36 and is provided with a spiral groove 41 in which a pin 42 carried by sleeve 36, rides. Hollow shaft 39 and sleeve 36 are in end abutment and held against end movement by the end bearings in the housing. Axial movement of the inner shaft 40 will cause pin 42 to ride in groove 41 and sleeve 36 to rotate relative to inner shaft 40 and hollow shaft 39. Thus, weight 34 will be caused to shift arcuately relative to weight 33 and, through gears 37 and 38, weight 32 will be shifted in an equal and opposite amount relative to weight 31. Movement of inner shaft 40 in an axial direction may be effected in an appropriate manner. For example, an adjusting screw 43 may be threaded into oscillator housing 24 and coupled to shaft 26 by means of a yoke 44 engaging a groove 45 in an extension 46 of shaft 40. Adjusting screw 43 can be held in selective positions of adjustment by a locking screw 47.

Figure 5:
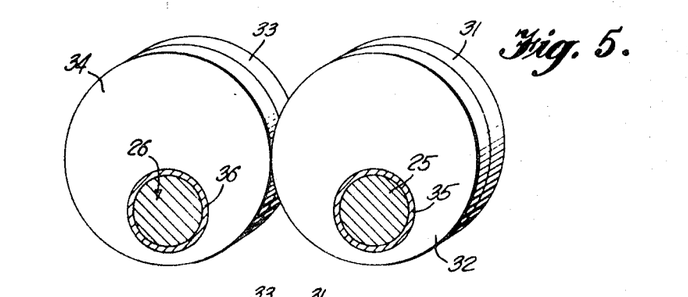
FIGURE 5 is a schematic perspective view illustrating an adjusted position of the eccentric weights of the oscillating means.
Figure 6:
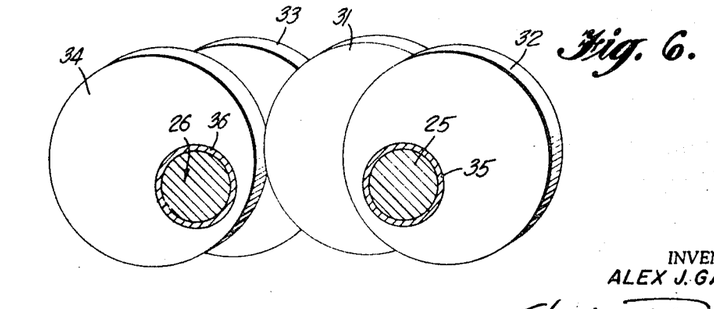
FIGURE 6 is a view similar to FIGURE 5 showing the eccentric weights of the oscillating means in still another position.

It will be obvious from the above that oscillating means 23 can be adapted to exert alternate vibrating thrust forces that are directed only in directions substantially parallel to the longitudinal axis of carriage 12 and perpendicular to the longitudinal axis of the tree. A change in the intensity of thrust developed by oscillating means 23 can be made by manipulating adjustment screw 43 to vary the arcuate relationship of the eccentric weights to and from concentricity axially of their respective shafts. If the weights are aligned on their shafts as shown in FIGURE 5, maximum thrust toward and away from the tree will be obtained. If the eccentric weights are displaced through an angle of 90°, as shown in FIGURE 3, the oscillating thrust will be less, and if the weights are displaced at an angle of 120°, as shown in FIGURE 6, the force is further reduced. Thus, an important advantage inherent in the oscillating means disclosed as part of this invention is that the intensity of oscillations or vibrations imparted to the tree can be readily adjusted over a wide range of intensities, thereby facilitating easy adjustment of the tree shaking operation by an operator of the tree crop harvester to provide adequate shaking to dislodge the crop from the tree while preventing damage to the tree arising from an excessively severe shaking action.

The oscillations and vibrations generated by oscillating means 23 are transmitted to the trunk of a tree to be harvested through a clamp assembly which comprises two pairs of gripper arms 60 and 62 and a bearing plate 85 rigidly connected to the oscillating means 23.

The clamp assembly which comprises at least two pairs of rigid gripping arms 60 and 62, as shown in FIGURE 1, are connected at points 64 and 66, respectively, to opposite sides of oscillating means 23.

While FIGURE 1 depicts two pair of gripping arms, it is obvious that more or less than two pair of gripping arms could be used, such as employing four sets of gripping arms, each set comprising two arms mounted at the top of each of two respective oscillating means 23 and the other pair of arms mounted at the bottom of each of two respective oscillating means 23 to provide more positive contact with the trunk of the tree. The engaging means or arms 60 and 62 can be attached to oscillating means 23 in any suitable fashion. As is shown in FIGURE 1, gripping arms 62 are pivotally connected at 66 to oscillating means 23, and gripping arms 60 are pivotally connected at 64 to the opposite side of oscillating means 23, whereby, both pair of gripping arms 60 and 62 are pivotally connected, respectively, at 64 and 66 at opposite sides of oscillating means 23. In some instances it might be desirable to maintain one of the gripping arms of each pair in a rigid position to impart to the apparatus greater capacity to transmit the vibratory forces to the tree to be harvested. In other instances, it might be desirable to have all of the gripping arms pivotally connected in order to permit wider opening of the gripping arms and to reduce to some degree the vibrational stresses imparted through the tree crop harvesting apparatus. It is obvious that the manner of attaching the gripping arms to the oscillating means can also be arranged to provide that the gripping arms can be adjusted to be either rigidly connected to the oscillating means or to be movably connected to the oscillating means depending upon the requirements of a particular harvesting operation.

Cylinder means, indicated generally by reference numeral 72, in FIGURE 1, comprises an outer housing containing a hydraulically actuated piston which is slidable therein and is constructed in a conventional manner. Gripping arms 60 and 62 are mounted on oscillating means 23 with their respective pairs of pivoted ends 61 and 63 extending outwardly beyond the side of oscillating means 23. Rods 65 and 67 are rigidly connected to the pivot ends 61 and 63 of gripping arms 60 and 62.

Cylinder means 72 is secured to a rod 67 and a piston rod 76 is secured at one end to piston within cylinder means 72, and at the other end to the rod 65.

The type of cylinder means employed to urge the engaging means into forcible engagement with the trunk of a tree does not comprise a critical element of this invention and, therefore, any suitable conventional means can be employed to reciprocate the engaging means. As was indicated above, the engaging means, cylinder means and the oscillator driving means are hydraulically actuated. FIGURE 1 shows hydraulic pumping means 80 comprising a pump for hydraulic fluid and a reservoir for hydraulic fluid which can be any conventional fluid reservoir and pumping means. In the embodiment shown in FIGURE 1, in which carriage 12 is self-propelled by a motor 22. The hydraulic driving fluid is conducted to hydraulic motor 28 through flexible conduit 30 and also to cylinder means 72 through flexible conduits 82 and 84. In the embodiment of this invention wherein the tree crop harvester carriage 12 is not self-propelled but is connected to a conventional tractor, hydraulic motor 28 and cylinder means 72 are connected in fluid communication through pumping means 80 to the hydraulic fluid power take-off normally provided with a conventional tractor. In any event, the use of such hydraulically operated motor 28 and reciprocating means 72 does not constitute a critical element of this invention and there can be substituted therefor battery powered or other electrically driven means suitable for the purpose served by those elements of structure.

The entire motion transmitting means 23 and the gripping arms and motor 28 are all mounted on a platform 81 which is suspended above the mobile carriage 12 by shock absorbing springs 83.

Figure 2:
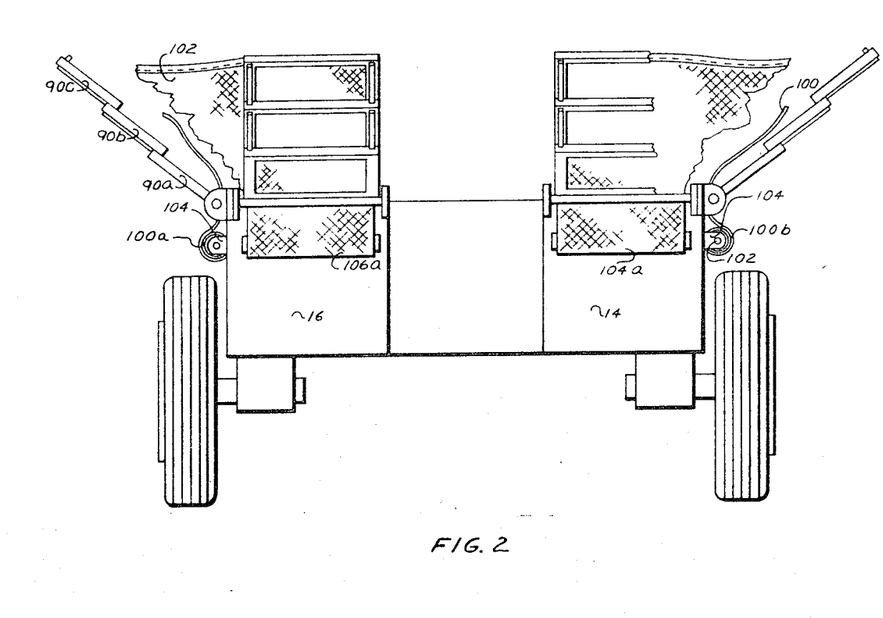
FIGURE 2 is a front end view of the carriage means of the apparatus of this invention with a portion of the crop catching means shown in the unfolded and extended position.

The crop catching means of this invention are shown in FIGURES 1 and 2 and comprise extensible rigid supporting frames comprising side frames 90 and 92. The construction of side frames 90 and 92 is identical and consists of overlapping slidable frames 90a, 90b, 90c and so forth, as shown in FIGURE 2. The frame members are preferably constructed of a lightweight material such as aluminum or plastic and can comprise open rectangles formed by pipes or bars. As is shown in FIGURE 2, the supporting frames can be folded or unfolded manually. The frame member 90a adjacent carriage 12 is hingedly connected to the carriage to permit the retracted frames to be folded onto the upper surface of carriage 12 during movement of the tree crop harvester from one location to another.

The rear supporting frame 94 is identical in construction to the side frames 90 and 92 and no additional description thereof is given herein. The front frame member comprises two separate sections 96 and 98 which, in their retracted positions, are hingedly connected to the front top surface of carriage 12 and, when in their retracted positions, are adapted to be folded onto the top surfaces of parallel body members 14 and 16.

The crop catching means supporting frames have attached thereto a resilient covering material, indicated in FIGURE 2 by reference numeral 100, which can consist of canvas, nylon, plastic or any other resilient sheet material. As is shown in FIGURE 2, the sheet material is stored on rolls 100a and 100b that are wound on shafts 102 which are connected to the sides of carriage 12 by mounting plates 104. As will be obvious from FIGURES 1 and 2, after the supporting frames of the crop collecting means are extended into position from the sides and back of carriage 12, the sheets of covering material are merely unrolled over the upper surfaces of the supporting frames and are connected to the supporting frames by hooks, buttons, snap fasteners or any other conventional means.

It will be noted that between the ends of the side supporting frames and the rear supporting frame are open sectors 102. During storage of the covering material on rolls 100a and 100b, the sectors of the covering material are folded over onto the rectangular sections of covering material that are stored at the sides of carriage 12. More specifically, each of the sectors 102 is folded onto its respective rectangular side covering section and would for storage on covering roll 100a or 100b, as shown in FIGURE 2.

The covering materials for supporting frame members 96 and 98 are labeled 104 and 106 and are stored on rolls 104a and 106a respectively, which are rigidly connected to the front sections of carriage body members 14 and 16 respectively. That section of front covering member labeled 108, which covers the open area between supporting frames 96 and 98, can comprise an integral part of either of covering materials 104 or 106 and can be folded over in alignment with either of those sections of covering material for storage on either of the rolls 104a or 106a. In addition, that section of covering material that would be required to close the opening between the front of carriage 12 and the side of the tree remote from oscillating means 23 can comprise an integral portion of the central front covering section 108.

In operation, the tree crop harvester, with the crop catching means folded onto the carriage, is moved into position adjacent a tree to be harvested with the parallel body members 14 and 16 extending around the sides of the tree. The carriage and oscillating means are positioned with a bearing plate 85 abutting the tree trunk, and the clamp assembly is set in forcible engagement with the tree trunk. Then, the crop catching means are unfolded and extended and assembled around the carriage under the tree. The oscillating means are actuated to shake the tree through the bearing plate 85 and the crop dislodged thereby is collected in the crop catching means. Thereafter, the crop can be removed from the harvester either manually or by suitable apparatus attached to the harvester and adapted to remove the collected crop therefrom either continuously or intermittently. After the crop has been removed from one tree, the crop catching means is disassembled and folded onto the carriage, the tree engaging means and vibrating means are disengaged from the tree trunk, and the harvester is moved to the next tree to be harvested.

Figures 11, 12, 13, 14, 15, 16, 17:
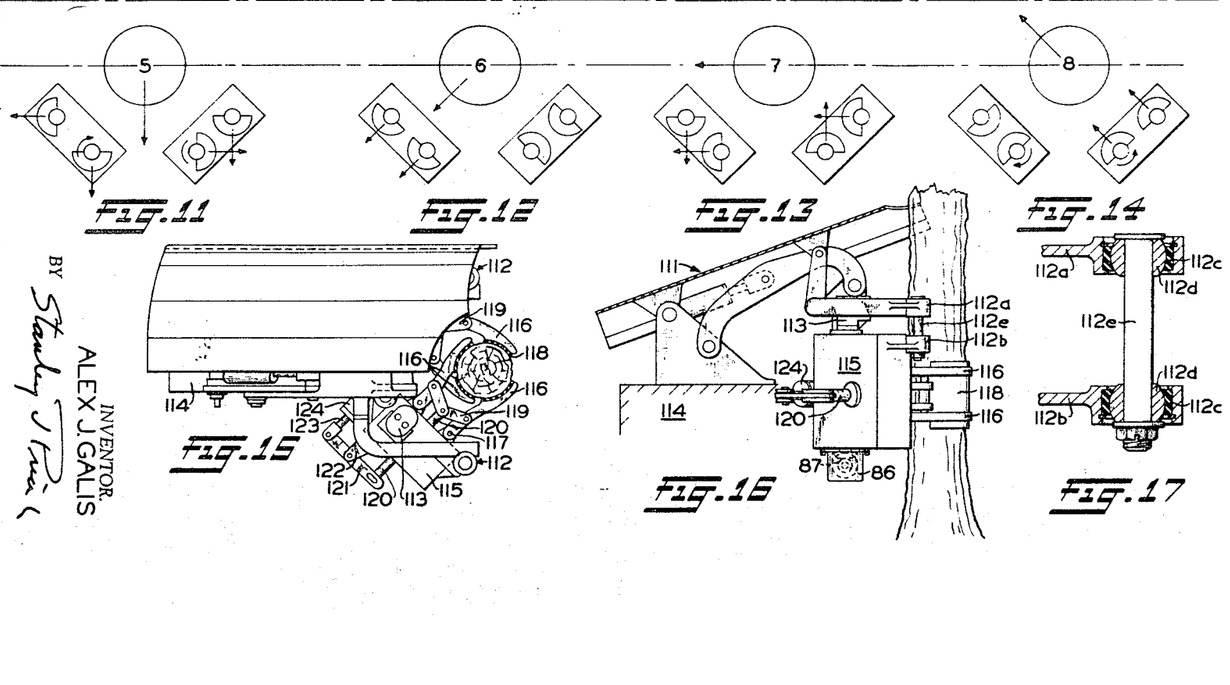
FIGURE 15 shows a top view of the nutating means clamped to the trunk of a tree with its leveling link shield shown over half of the assembly.
FIGURE 16 is a view in elevation of the nutating means of FIGURE 15 illustrating the double clamp assembly.
FIGURE 17 discloses the pivoted hanger assembly 112 partially in section and illustrating the cushioned bearing and bushing members.

Referring now to the embodiment of FIGURES 7–17 in detail; FIGURE 15 discloses applicant's dual citrus tree crop harvester mounted to a hydraulic boom 111 of a mobile crop harvesting apparatus by two pivoted hanger assemblies 112.

Figures 7, 8:
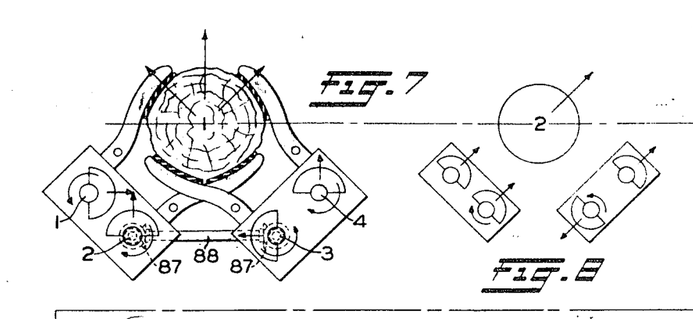
FIGURE 7 is a diagrammatic top plan view of the two oscillating means forming the nutating means clamped to the trunk of a tree.
FIGURES 8–14 show seven of eight sequential positions of the eccentric weights in the two oscillating means that produce a force on the trunk of the tree to be harvested which starts in a northward vector (FIGURE 7) and continues clockwise in smooth uninterrupted motion producing a nutation to the trunk of the tree to be harvested.

The tree crop harvester comprises two reciprocating drive mechanisms each of which is suspended from and pivoted to one of said two pivoted hanger assemblies 112, and each of them includes a motor 113 similar to motor 28 and an oscillating means 115 similar to oscillating means 23. Each motor 113 of the two reciprocating drive mechanisms is controlled by a common valve which is carried by the mobile housing 114. Each of the two oscillating mechanisms has variable eccentric means, similar to the ones previously disclosed in FIGURE 4, each of which is secured to a respective control shaft which would be an extension of shaft 40. Connected to the bottom of each oscillating means 115 is a common gear box 86 with conventional bevel gears 87 therein with a connecting shaft between them so that they are driven equally and held in their respective positions by either one of the two motors 113 (FIGURE 7). Within each oscillating 115 there is suitable gearing, as previously described within housing 24 of FIGURE 4, which causes rotation of the variable eccentrics and the eccentrics in turn are made variable by movable weights such as those weights 32 and 34 previously described in this application.

Connected to each oscillator 115 is a clamp assembly having two pairs of arms 116 vertically spaced one pair above the other with one end 117 of each arm being pivotally connected to the oscillator housing and the other end of each arm adapted to grip an abutting pad or the tree. One such abutting pad 118 is secured to the gripping end of each vertical pair of arms. Each oscillator has four arms pivotally mounted thereon. One pair of arms adapted to hold a tree and another identical pair directly above or below in vertical alignment also adapted to hold the same tree in the same manner which places two arms on one side of the tree vertically spaced from each other with a tree abutting pad 118 between them and another pair of vertically spaced arms 180° around the other side of the tree pressing against the tree with a common tree abutting pad 118 fixed to the hand end of each arm resulting in the tree being held in a four arm, two pad, 180° opposing grip. 90° from this gripping apparatus is another similar gripper means comprising four more arms adapted to grip the tree at two 180° intervals between the first gripping means, therefore, the tree is held by eight arms and four abutting pads at 90° intervals throughout the tree's 360° circumference. The abutting pads are adapted to hold the tree and release the tree through a separate linkage system fitted to the arms of each oscillator 115. The linkage system includes links 119 pivotally connected at one end to the center of each arm 116 and the other end of the respective link 119 is pivotally connected to a shaft or connecting rod 120 which is reciprocated causing the links to pivot and the arms to pivot at the shoulder 117 to and away from the tree. The connecting rod 120 has its other end pivotally connected to an end of lever 121 that reciprocates rod 120. The lever 121 is pivotally secured intermediate its ends to a bracket 122, which is part of the respective transmission housing 115. The other end of the lever 121 is pivotally connected to a hydraulic piston rod 123 which reciprocates within a hydraulic cylinder 124 which in turn is fixed to the side of the respective transmission housing 115 and actuated by a valve within mobile housing 114.

Hanger assembly 112, shown in detail in FIGURE 17, has a fitting 112a attached to the boom 111 and another fitting 112b fitted to either one of the two respective reciprocating drive mechanisms. Each fitting 112a and 112b has a through bore therein and a counterbore housing a shock absorbing grommet 112c with a concentric bearing 112d fitted therein. A flanged top, threaded end bushing pin 112e is journaled through both bearings and secured therein by the flanged top at one end and a nut means on the other said threaded end.

When the tree to be harvested is about to be nutated the boom 111 is lowered slightly taking all the tension off pin 112e and converting the hanger assembly 112 to a shock dampener system so that little or no vibration is transferred from the machine and the tree back to the boom and tractor.

The creation of the actual rotation motion or nutation which is imparted to the tree can be best seen by following the schematic disclosures of FIGURES 7-14.

For purposes of clarity the four eccentrics and their four shafts in the schematic figures will simply be numbered 1, 2, 3, and 4. The eccentrics are so pre-arranged that when all four shafts rotate together in the direction indicated by the arrows of FIGURE 7, the initial resultant will be that the forces of shafts 1 and 3 cancel out and the resulting force of each transmission or motion transmitting means 115 will be the resultant force of shafts 2 and 4 which is designated 1 and as before described is a northward vector as can be seen in FIGURE 7.

It should be here noted that all four shafts do rotate together since shafts 1 and 2 are geared together in their respective transmission 115 as are shafts 3 and 4 in their respective transmission. It should also be noted that both pairs of shafts 1, 2 and 3, 4 rotate an equal amount due to the fact that shafts 2 and 3 are geared together by gears 87 on shaft 88 which also means either motor 113 or both together can drive both transmissions 115 simultaneously.

As the shafts 1, 2 and 3 and 4 continue to rotate there is another resulting vector 2 which is 45° later and which is 45° east of north since the forces of shafts 3 and 4 cancel out and the resulting vector 2 is produced by the summation of the forces of shafts 1 and 2.

Figure 9:
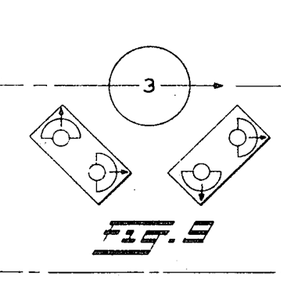
Figure 10:
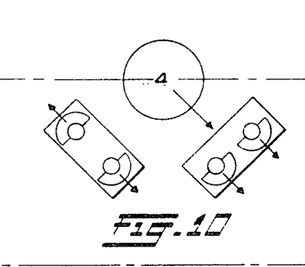

After another 45° rotation of the four shafts the vectors of shafts 1 and 3 cancel out with the resulting forces of shafts 2 and 4 producing a vector 3 in an east direction.

This continues until each shaft rotates the remaining 270° simultaneously with the resulting vector also rotating the remaining 270° which is shown progressively in FIGURES 10-14, whereupon the resulting force is again in a northward direction and the cycle continues to repeat itself over and over resulting in a circular output which when applied to a tree that has one end fixed to the ground this circular output imparts nutation to the tree.

It should be here noted that one unitary transmission or motion transmitting means could be constructed, by a mere choice of design, with one or two pair of gripper means fixed thereto which when attached to the tree to be harvested would impart a nutating motion from the unitary transmission through the gripper means to the tree and its appendages.

OPERATION

The double caliper tree crop harvesting machine will be transported to the citrus tree to be harvested and it is then brought adjacent to and in juxtaposition with the said tree. At this time, the calipers or arms 116 are actuated by the piston rods 123 within the hydraulic cylinders 124 to firmly hold the crop harvesting machine to the tree at four separate positions 90° apart. At this time, the eccentricity of the weights on the shafts within the transmissions 115 are varied by the gear box within housing 114. When this is done either or both motors 113 will be actuated by their respective valves, housed within housing 114, causing the transmissions to be rotated in synchronism causing the arms 116 and pads 118 to be vibrated in synchronism thus causing a rotation or nutation type motion to the tree trunk as shown in FIGURES 7-14 wherein the branches and fruit of the branches will also be nutated. At any time during the nutation the sequence and amplitude can be changed in each transmission simultaneously by a simple adjustment of the shafts 40 which will rotate to the eccentrics a few degrees and thus will effect the amplitude of nutation of the tree and all its appendages. It is also possible to so adjust the motor valve, housed within housing 114, so that the tree will be nutated in the opposite direction which will produce a momentary complete stop to the trunk and then a nutation in the opposite direction; however, the appendages would continue nutating in their original direction and then would be more abruptably stopped and counter rotated with the result that much of the citrus fruit at the beginning of the counter rotation would be separated from its respective branches and dropped therefrom. The citrus crop will drop intermittently during constant amplitude nutation, varied amplitude nutation, complete stopping of nutation, reversed nutation, and initial commencement of nutation. When the crop has been separated from its respective branches the crop harvesting machine can be stopped quickly by stopping the motor 113 and the entire machine can be uncoupled from the tree by reverse actuation of the piston rods 123 within cylinders 124 thus separating the pads 118 from the trunk of the tree. The entire machine can then be withdrawn from the tree by first pivoting one transmission section about its hanger assembly 112 and then the other section about its hanger assembly 112. The apparatus is then simply transported to the next citrus tree to be harvested.

From the foregoing description, it is seen that the crop catching means of this invention is of a simple, rugged construction and can be manually assembled for operation with considerable ease. Although two embodiments of apparatus suitable for use with the concept of this invention have been disclosed herein, it is obvious that one skilled in the art could readily conceive equivalent structures that could be substituted for the apparatus described herein and that such substituted structure would still be within the purview of the concept of this invention. Although a specific description of the apparatus employed herein has been given, it will be understood that the structural details described and shown are merely by way of illustration, and the invention may take other forms within the scope of the appended claims.

I claim:
1. Tree shaker apparatus comprising,
   mobile carriage means adapted to be portable and readily movable, oscillating means secured to said mobile means, oscillating driving means mounted on said mobile carriage means and adapted to actuate said oscillating means, engaging means secured to said oscillating means and constructed and arranged to forcibly engage the trunk of a tree, and vibrating means rigidly secured to said oscillating means and adapted to transmit vibratory motion from said oscillating means to the trunk of said tree.

2. Tree shaker apparatus as described in claim 1 wherein said oscillating driving means and said engaging means are actuated hydraulically, and having pumping means mounted on said mobile carriage means and adapted to supply hydraulic fluid to said oscillating driving means and said engaging means.

3. Tree shaker apparatus as described in claim 1 wherein said mobile carriage means is self-propelled and includes, propelling means mounted on said mobile carriage means, and hydraulic fluid pumping means adapted to supply hydraulic fluid to actuate said oscillating driving means and said engaging means.

4. Tree shaker apparatus as described in claim 1 wherein the engaging means comprises opposing rigid clamping arms pivotally secured at opposite ends of said oscillating means, and arm reciprocating means rigidly connected to at least one of the clamping arms to move said opposing arms toward and away from each other into and out of engagement with the trunk of said tree.

5. Tree shaker apparatus as described in claim 1 wherein said reciprocating means comprises a plurality of eccentrically weighted shafts mounted in parallel relation, and connecting means to drive the weighted shafts in opposite phase to produce a lineal thrust in opposite directions substantially perpendicular to the longitudinal axis of said tree.

6. Tree shaker apparatus as described in claim 1 with said oscillating means being of the type developing thrust alternately in opposite linear directions, said mobile means comprising a U-shaped body having spaced opposing side members forming therebetween an opening extending from one end of said mobile means toward said oscillating means, said engaging means comprising opposing clamping arms pivotally connected to said oscillating means and extending outwardly therefrom in vertically spaced relation with the opening in said mobile means, another hydraulically actuated reciprocating means mounted adjacent said reciprocating means and having a movable shaft rigidly connected to at least one of said clamping arms, said another reciprocating means adapted to move at least one of said clamping arms toward and away from the other into and out of engagement with the trunk of said tree, hydraulically actuated reciprocating driving means adapted to actuate said reciprocating means, hydraulic fluid pumping means mounted on said mobile carriage means and adapted to supply hydraulic fluid to said reciprocating driving means and said another reciprocating means.

7. Tree shaker apparatus as described in claim 1 having other reciprocating means connected to said engaging means, said another reciprocating means comprising, a housing fitted at one end to a portion of said engaging means, a piston slidably enclosed in said housing, a shaft extending through one wall of said housing and slidable therethrough, said shaft rigidly connected at one end to said piston and rigidly connected at the other end to another portion of said engaging means, said other reciprocating means constructed and arranged to urge said engaging means into forcible engagement with the trunk of said tree upon hydraulic actuation of said piston.

8. Tree shaker apparatus as described in claim 1 wherein, said mobile means comprises separate side portions spaced from each other and forming therebetween an opening extending from the front of said mobile means into the body of said mobile means, said engaging means pivotally connected to said reciprocating means and extending outwardly therefrom above the opening in the mobile means, another hydraulically driven reciprocating means mounted on said mobile means and connected to said engaging means to actuate said engaging means, hydraulic fluid pumping means mounted on said mobile means and adapted to supply hydraulic fluid to the reciprocating driving means and to the said another reciprocating means, and foldable extensible crop catching means mounted on the mobile means and constructed and arranged to form in assembly a substantially continuous receptacle for the tree crop when the said engaging means transmits motion from the reciprocating means to the said tree.

9. Tree shaker apparatus as described in claim 1 and having, foldable crop catching means comprising a plurality of extensible supporting members connected to said mobile means, a plurality of sections of resilient crop catching material attached to said supporting members and adapted to form a continuous crop catching surface surrounding said mobile means when said crop catching means are extended and unfolded.

10. Tree shaker apparatus comprising, engaging means adapted to be fitted to a means to be harvested, nutating motion transmitting means fitted to said engaging means, drive means adapted to actuate said nutating motion transmitting means so that motion imparted from the said drive means to the said nutating motion transmitting means through the engaging means to the said means to be harvested will cause the said means to be harvested to nutate whereby the crop of the tree will be severed from the tree by said nutating motion imparted thereto.

11. Tree shaker apparatus of claim 10 wherein said nutating motion transmitting means comprises a plurality of eccentric weight means fitted to a plurality of vertical shafts which are connected to each other and are adapted to rotate together when actuated by said drive means.

12. Tree shaker apparatus of claim 10 wherein said motion transmitting means comprises two reciprocating means and said engaging means comprises two separate sets of two pairs of calipers, each set being fitted to a respective reciprocating means and each set being actuated by said drive means.

13. Tree shaker apparatus of claim 12 wherein said two reciprocating means are connected by a geared shaft.

14. Tree shaker apparatus of claim 12 wherein each of said two reciprocating means is fitted to said mobile means by way of a respective hanger assembly which facilitates oscillation of each reciprocating means independently from said mobile means, said apparatus operable upon actuation of said engaging means to insulate said mobile means from each of said reciprocating means so that each hanger assembly absorbs substantially all vibration shock from each of the two reciprocating means.

15. Tree shaker apparatus of claim 12 which includes pairs of calipers each having a pair of links connected at one end thereof to a connecting rod, said connecting rod pivotally connected to a piston rod by a lever positioned between said connecting rod and said piston rod, and said lever being pivotally connected to said reciprocating means.

16. Tree shaker apparatus of claim 10 wherein said motion transmitting means comprising two reciprocating means spaced 90° apart,     said drive means further comprising hydraulic motor means driving each reciprocating means and actuating said engaging means,     said engaging means further comprising two sets of two pairs of calipers, each set being fitted to a respective reciprocating means each of which is actuated by a hydraulic motor fitted to a respective reciprocating means.

References Cited
UNITED STATES PATENTS

| | | | |
|---|---|---|---|
| 2,700,268 | 1/1955 | Lowe | 56—328 |
| 3,077,721 | 2/1963 | Balsbaugh | 56—328 |
| 3,163,458 | 12/1964 | Brandt | 56—328 XR |
| 3,218,790 | 11/1965 | Edgemond | 56—329 |
| 3,225,529 | 12/1965 | King | 56—328 |
| 3,338,040 | 8/1967 | Shipley | 56—328 |

RUSSELL R. KINSEY, Primary Examiner